B. J. SITTON.
Piston.
No. 233,169.   Patented Oct. 12, 1880.
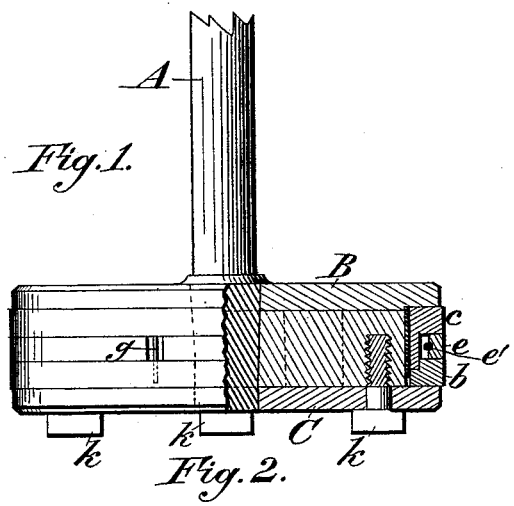
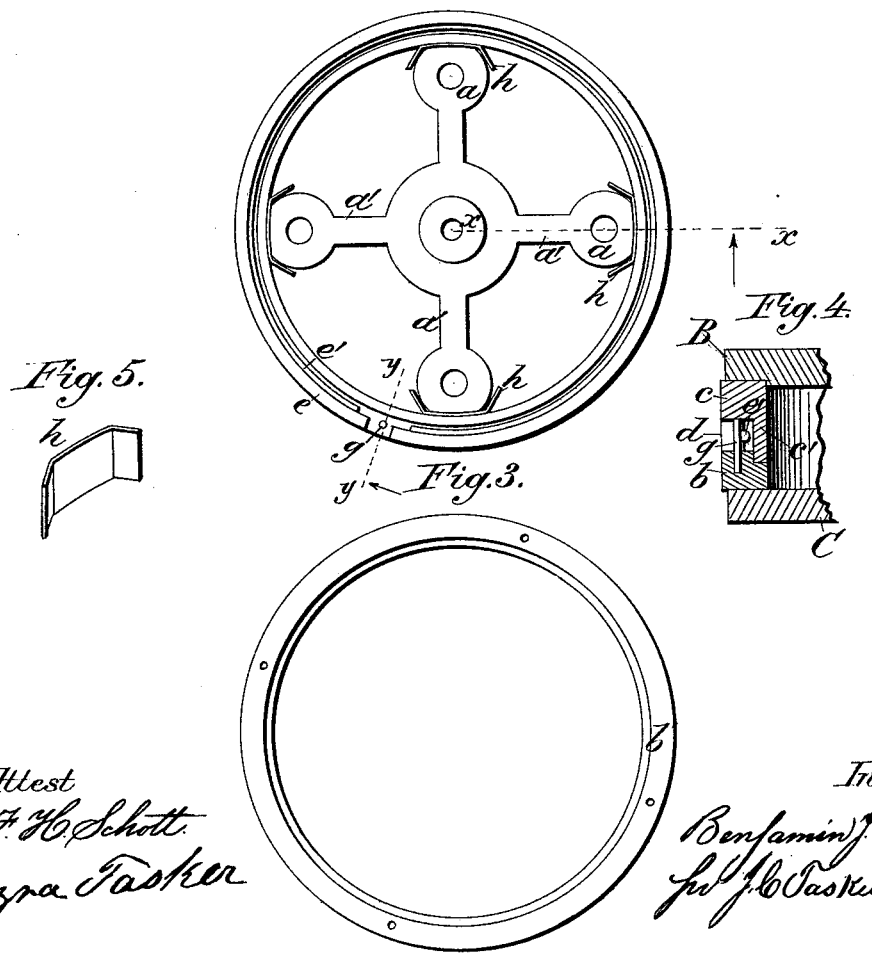
Attest
F. H. Schott
Ezra Tasker
Inventor:
Benjamin J. Sitton
per J. C. Tasker atty

ABBREVIATED

UNITED STATES PATENT OFFICE.

BENJAMIN J. SITTON, OF SELMA, ALABAMA.

PISTON.

SPECIFICATION forming part of Letters Patent No. 233,169, dated October 12, 1880.

Application filed January 29, 1880.

*To all whom it may concern:*

Be it known that I, BENJAMIN J. SITTON, a citizen of the United States, residing at Selma, in the county of Dallas and State of Alabama, have invented certain new and useful Improvements in Pistons; and I do hereby declare that the following is a full, clear, and exact description thereof, reference being had to the accompanying drawings, and to letters of reference marked thereon, which form part of this specification.

This invention relates to an improvement in pistons to be used for steam-engines, pumps, and other machines where it becomes necessary to form a steam or water tight joint between a reciprocating piston and the cylinder within which it moves; and the invention consists in the construction and arrangement of the metallic packing-rings, as will be hereinafter fully described.

In the accompanying drawings, Figure 1 is a side elevation of the piston and rod, a part of the piston being broken away, so as to show a section on the line $x$ of Fig. 2. Fig. 2 is a plan of the piston with the follower and one of the packing-rings removed, showing the relative position of the various parts. Fig. 3 is a plan of one of the rings, showing the holes for the reception of the pin which retains the spring-ring in place. Fig. 4 is a section on the line $y\ y$ of Fig. 2, being the point where the spring-ring is divided. Fig. 5 is a perspective view of one of the packing or bearing plates placed between the rings and bearing-lugs of the piston.

A represents the piston-rod, and B the body of the piston, provided with the ordinary bearing-lugs $a$ and stiffening-flanges $a'$. The periphery of the part B has a rabbet formed in the side which carries the bearing-lugs, said rabbet forming a seat for the ring $c$, which has an L-shaped section, the long arm $c'$ of which enters a recess formed for its reception in the inner edge of the ring $b$. These rings are both what are technically called "solid"—that is, they are not cut at any point to allow them to adjust themselves to cylinders slightly varying in diameter, but are fitted so as to move smoothly from end to end of the cylinder in which they are to work. When these rings $c$, $c'$, and $b$ are placed together, a rectangular space, $d$, is left between them, which receives the cut spring-ring $e$. This ring fills the space between the solid rings in one direction, but leaves an open space or recess behind it. In this recess is placed the wire spring $e'$, the resilient force of which is employed in expanding the spring-ring, and in order that this force may always be exerted in the proper direction the ring $e$ is provided upon its inner side with a groove of such depth as may be necessary to insure the retention of the spring $e'$ in the right place. The expansive qualities of this spring-ring cause it to always fill the cylinder, preventing leakage, but the pressure is not so great as to cause undue friction and consequent loss of power.

In order to retain the several rings in their proper relative positions, a pin, $g$, is placed in one of several holes formed in the ring $b$ and passes between the ends of the spring-ring, thus preventing the rings from turning on each other, but allowing the wearing-surface of the spring-ring to be changed with relation to the cylinder by shifting the pin from one hole to another in the ring $b$, thus preventing the cutting or forming of grooves in the cylinder by the spring-ring.

Bearing-pieces $h$, of the form shown in Fig. 5, are placed over the outer ends of the lugs $a$ and receive the direct pressure of the rings. They also form a means of adjustment, as by using them of different thicknesses the piston and piston-rod may be raised to compensate for the extra wear experienced in horizontal cylinders upon the under side, which has to carry the whole weight of the piston.

In order to hold the rings properly in place the follower C is secured to the lugs $a$ by means of the screw-bolts $k$, which pass through the follower and screw into the lugs.

Many devices have heretofore been constructed for accomplishing the result attained in this piston; but most of them have proved defective by causing too great an amount of friction between the parts, which resulted in not only loss of power, but the destruction of both piston and cylinder by the wear and cutting of one into the other.

Having thus described my invention, I claim as new, and desire to secure by Letters Patent, the following:

1. In a cylinder-piston, the combination of the piston-body with the L-shaped solid ring, the spring-ring, and edge-recessed solid ring $b$, substantially as and for the purpose specified.

2. The combination of the solid L-shaped ring $c$ with solid ring $b$, spring-ring $e$, and spring $c'$, all arranged and operating substantially as and for the purpose set forth.

In testimony whereof I have hereunto affixed my signature, this 22d day of January, 1880, in presence of two witnesses.

BENJAMIN J. SITTON.

Witnesses:
　J. T. WEST,
　H. S. D. MALLORY.